(12) United States Patent
Singasani (10) Patent No.: US 8,572,418 B2
(45) Date of Patent: Oct. 29, 2013

(54) MOVING CLOCK GATING CELL CLOSER TO CLOCK SOURCE BASED ON ENABLE SIGNAL PROPAGATION TIME TO CLOCKED STORAGE ELEMENT

(75) Inventor: Chandrasekhar Singasani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 541 days.

(21) Appl. No.: 12/402,553

(22) Filed: Mar. 12, 2009

(65) Prior Publication Data
US 2010/0231282 A1 Sep. 16, 2010

(51) Int. Cl.
*G06F 1/10* (2006.01)
(52) U.S. Cl.
USPC .......................................... 713/322; 716/133
(58) Field of Classification Search
None
See application file for complete search history.

(56) References Cited

U.S. PATENT DOCUMENTS

| | | | |
|---|---|---|---|
| 6,020,774 A | 2/2000 | You-Ming | |
| 6,318,911 B1 * | 11/2001 | Kitahara | 716/108 |
| 6,434,704 B1 | 8/2002 | Dean | |
| 6,440,780 B1 | 8/2002 | Kimura et al. | |
| 6,550,044 B1 | 4/2003 | Pavisic et al. | |
| 6,609,228 B1 | 8/2003 | Bergeron | |
| 6,651,224 B1 * | 11/2003 | Sano et al. | 716/114 |
| 7,808,293 B2 * | 10/2010 | Fujisawa | 327/295 |
| 2005/0028118 A1 | 2/2005 | Kapoor | |
| 2007/0143726 A1 | 6/2007 | Mizutani | |

OTHER PUBLICATIONS

International Search Report—PCT/US2010/027176, International Search Authority—European Patent Office Jun. 18, 2010.
Written Opinion—PCT/ US2010/027176, International Search Authority—European Patent Office Jun. 18, 2010.
"Clock Tree Generation", www.es.lth.se/ugradcourses/cadsys/Ectgen.pdf, printed Feb. 23, 2009, 9 pages.
Taiwan Search Report—TW099107341—TIPO—Jun. 7, 2013.

* cited by examiner

*Primary Examiner* — Kenneth Kim
(74) *Attorney, Agent, or Firm* — Sam Talpalatsky; Nicholas J. Pauley; Joseph Agusta (57) ABSTRACT

In a particular embodiment, a method of generating an advanced gating cell clock tree includes determining a timing margin for a path between a clock gating cell and a digital data storage element such as a latch or flip flop. The circuit contains a clock source and when the timing margin for the path meets a predetermined threshold, the clock gating cell is automatically moved closer to the clock source. In a particular embodiment, the timing margin is automatically determined. A clock tree synthesis is performed to insert one or more buffers into the path and create an advanced gating cell clock tree.

30 Claims, 11 Drawing Sheets

MOVING CLOCK GATING CELL CLOSER TO CLOCK SOURCE BASED ON ENABLE SIGNAL PROPAGATION TIME TO CLOCKED STORAGE ELEMENT

I. FIELD

The present disclosure is generally related to a system and method of clock tree synthesis.

II. DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application that can be used to access the Internet. However, power consumption of such portable devices can quickly deplete a battery and diminish a user's experience.

One power saving feature is to use clock gating in a clock tree. The clock tree, or clock distribution network, distributes clock signal(s) from a common point to other circuit elements that receive a clock signal. The clock tree often consumes a significant portion of the power consumed by a semiconductor device and some of the power can be wasted in a branch of a clock tree when the output of the branch is not needed. To conserve power, a technique called clock gating is often used where logic gates and a clock gating cell are used to turn off certain areas of the tree when such areas are not in use. Unfortunately, the clock gating cell is often located close to the logic gates resulting in some areas that could be turned off not being turned off and thereby consuming added power.

III. SUMMARY

In a particular embodiment, a method of generating an advanced gating cell clock tree includes determining a timing margin for a path between a clock gating cell and a digital data storage element such as a latch or flip flop. The circuit contains a clock source and when the timing margin for the path meets a predetermined threshold, the clock gating cell is automatically moved closer to the clock source. The timing margin is the excess time in a clock cycle for a synchronous design to perform properly and comprises the difference between the actual change in an enable signal and the latest time at which the enable signal can change in order for the enable signal to be effective.

In one embodiment, the method further determines a maximum distance the clock gating cell can be moved towards the clock source where the maximum distance is determined based on the timing margin.

In a particular embodiment, a device includes a circuit with a clock tree designed using an automated circuit design tool. The circuit includes a clock signal generator, a digital data storage element, such as a latch or flip flop, coupled to the clock signal generator by respective paths, and a clock gating cell positioned on each of the respective paths. The position of each clock gating cell is based on a timing margin. On one of the respective paths, at least one buffer is positioned between the clock gating cell and the digital data storage element. The buffers are inserted to reduce clock phase delay and deviations of the clock signal. Clock phase delay and deviations of the clock signal from a target value result in delay uncertainty that can cause incorrect data to be latched within a register. Inserting buffers along a path helps to reduce the delay uncertainty. In a particular embodiment, the circuit is housed within a mobile terminal. In a particular embodiment, a computer-readable storage medium is disclosed that includes operational instructions that, when executed by a processor, cause the processor to insert a clock gating cell within a circuit such that the clock gating cell is positioned between a clock source and at least one digital data storage element. A timing margin for a path between the clock gating cell and the at least one digital data storage element is evaluated. When the timing margin is above a predetermined threshold, the clock gating cell is moved a predetermined distance away from the at least one digital data storage element. A clock tree synthesis is performed to insert one or more buffers into the path and create a first clock tree. In a particular embodiment a second clock tree is created before the clock gating cell is moved a predetermined distance from the at least one digital data storage element. The power consumption of the first and second clock tree is determined and a user is prompted to select the first clock tree or the second clock tree.

One particular advantage provided by the disclosed embodiments is that the clock gating cell is moved away from the logic gates resulting in more areas of the clock tree that are turned off when such areas are not in use. As a result, power is conserved.

Other aspects, advantages, and features of the present disclosure will become apparent after review of the entire application, including the following sections: Brief Description of the Drawings, Detailed Description, and the Claims.

V. DETAILED DESCRIPTION

Figure 1:
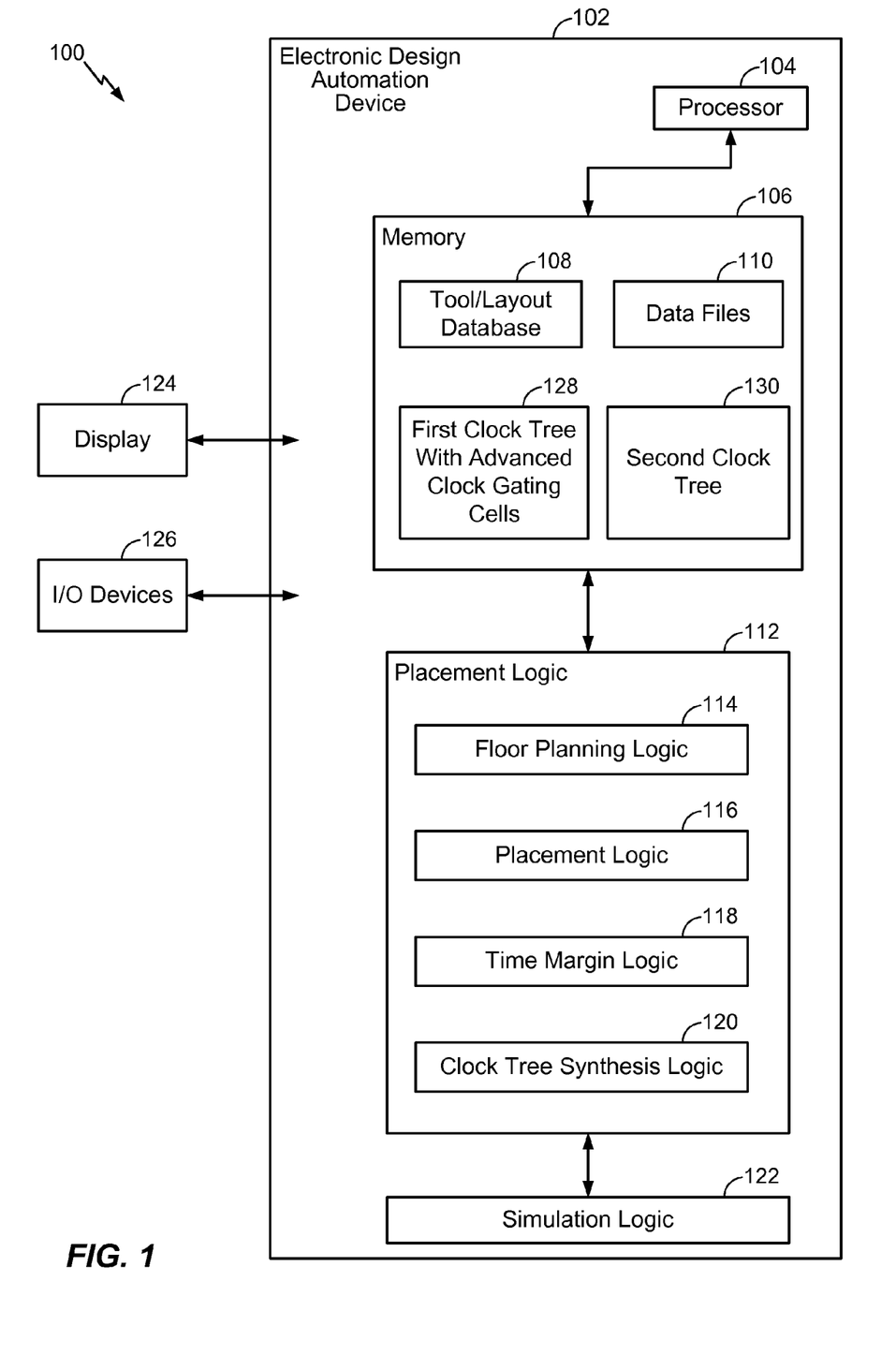
FIG. 1 is a block diagram of an illustrative embodiment of a system that includes logic to generate a clock tree.

Referring to FIG. 1 an illustrative embodiment of a system to perform a clock tree synthesis and create an advanced gating cell clock tree is depicted and generally designated 100. The system 100 includes an electronic design automation device 102, a display device 124, and input/output (I/O) devices 126. The display device 124 may be a computer screen or other visual screen to visually display output from the electronic design automation device 102. The I/O devices 126 are input and output devices used to control the electronic design automation device 102. The electronic design automation device 102 is a tool to enable designing and producing electronic systems that contain a clock tree. The electronic design automation device 102 contains a processor 104 coupled to memory 106, placement logic 112, and simulation logic 122.

The memory 106 contains a tool/layout database 108 and data files 110. The tool/layout database 108 contains tools and layouts to design a circuit with a clock tree. For example, the tool/layout database 108 may contain electronic representations of resistors, voltage sources, diodes, logic gates, other components or any combination thereof. The memory may also include a data file for a first clock tree with advanced clock gating cells 128 and a data file for a second clock tree 130. In a particular embodiment, the data file for a first clock tree with advanced clock gating cells 128 and the data file for a second clock tree 130 are stored in the data files 110. The data files 110 contain data files used in the electronic design automation device 102.

The placement logic 112 contains floor planning logic 114, placement logic 116, timing margin logic 118, and clock tree synthesis logic 120. The floor planning logic 114 enables the components in the tool/layout database 108 to be arranged to create a preliminary physical layout of the circuit. For example, the floor planning logic 114 may enable a user to arrange the components in a defined area, decide the location of input and output (I/O) pads, decide the location and number of power pads, decide the type of power distribution, and decide the location and type of the clock distribution of the clock tree.

During the creation of the advanced gating cell clock tree, the floor planning logic 114 uses the placement logic 116 to place clock gating cells on a path between a clock source and a digital data storage element such as a latch or flip-flop. The timing margin logic 118 determines the timing margins between the clock gating cells and the digital data storage element. The timing margins indicate a difference between an actual change in an enable signal and the latest time at which the enable signal can change in order for the enable signal to be effective.

The clock tree synthesis logic 120 inserts one or more buffers into the path to create a clock tree. The buffers are inserted to reduce clock phase delay and deviations of the clock signal. Clock phase delay and deviations of the clock signal from a target value introduce a delay uncertainty that can cause incorrect data to be latched within a register, resulting in a system malfunctioning. Inserting buffers along a path helps reduce the delay uncertainty.

The electronic design automation device 102 also contains the simulation logic 122. The simulation logic 122 is configured to determine the integrity of a circuit design, simulate the timing signal, and predict circuit behavior such as parasitic resistances and capacitances. The simulation logic 122 uses information about components in the tools/layout database 108 and their connections and creates mathematical models to simulate behavior of a physical electronic device or circuit. The simulation logic 122 is also configured to determine or estimate power consumption of the circuit and in particular, the advanced gating cell clock tree.

During operation, the electronic design automation device 102 is used to create a circuit layout. The floor planning logic 114 is used to determine a floor plan. Elements of the circuit are selected from the tool/layout database 108 and inserted in the floor plan. When an acceptable floor plan has been established, the routing of interconnections among the various blocks of the design is performed by the floor planning logic 114. After the detailed layout of the circuit blocks and interconnections have been established, a simulation of timing signals and circuit behavior is performed by the simulation logic 122. The placement logic 116 places a clock gating cell on a path between the clock source and a digital data storage element such as a latch or a flip-flop. The timing margin logic 118 is used to determine the timing margin for the path between the clock gating cell and the digital data storage element. If the timing margin for the path satisfies a predetermined threshold, the clock gating cell is automatically moved closer to the clock source by the timing margin logic 118. In a particular embodiment, the predetermined threshold is set by the electronic design automation device 102 and is based on the timing margin for each path. In another embodiment, the predetermined threshold is set by the user. For example, the predetermined threshold may be set by the user at about one nanosecond. The clock tree synthesis logic 120 performs a clock tree synthesis on the path and the clock tree synthesis includes inserting at least one buffer into the path to help reduce delay uncertainty. In a particular embodiment, the clock tree synthesis logic 120 inserts at least one buffer between the clock gating cell and the logic gate. After the clock tree synthesis has been performed, the simulation logic 122 may be used to determine the power consumption of the advanced gating cell clock tree.

By moving the clock gating cells closer to the clock source, more buffers can be inserted between the clock gating cells and the clock source. This allows more areas of the clock tree and the circuit to be turned off when the areas are not in use, resulting in power conservation.

Figure 2:
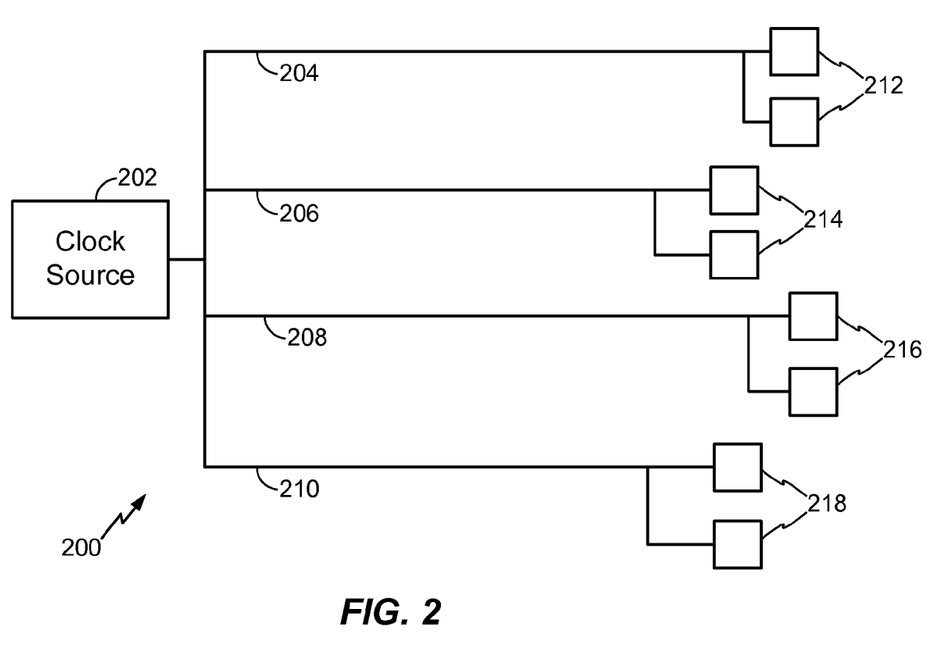
FIG. 2 is a diagram of a first illustrative embodiment of a circuit generated by the system of FIG. 1.

Referring to FIG. 2, a first particular illustrative embodiment of a circuit 200 is shown that may be created using the electronic design automation device 102, the floor planning logic 114, and components in the tool/layout database 108. The circuit 200 includes a clock source 202. The clock source 202 generates a clock signal and generally defines when a processor or element in the circuit will perform an operation. The clock source 202 is connected to a first path 204, a second path 206, a third path 208, and a fourth path 210. The first path 204, the second path 206, the third path 208 and the fourth path 210 each contain at least one logic gate. For example, first path 204 contains digital data storage elements 212, the second path 206 contains digital data storage elements 214, the third path 208 contains digital data storage elements 216, and the fourth path 210 contains digital data storage elements 218. Each logic gate may be further connected to other areas of the circuit 200 that are not shown.

Figure 3:
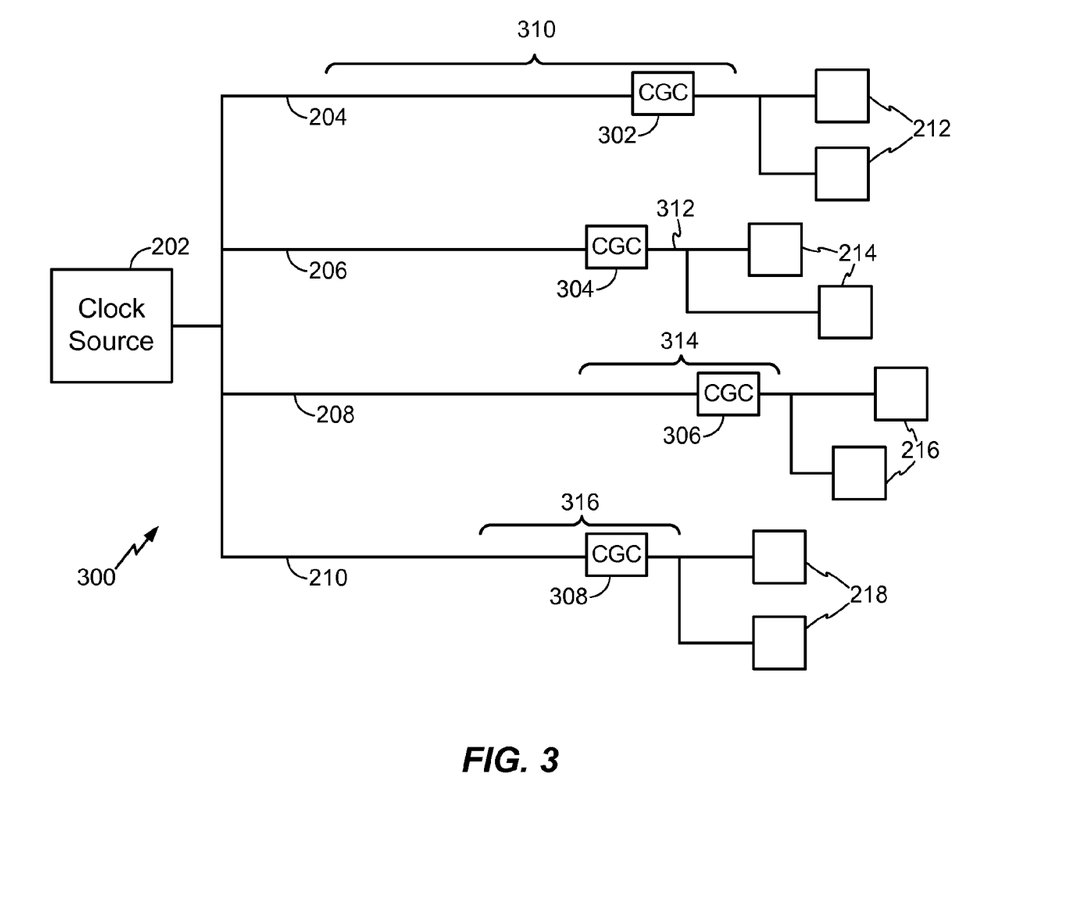
FIG. 3 is a diagram of a second illustrative embodiment of a circuit generated by the system of FIG. 1.

Each clock gating cell 302-308 may be positioned on a respective path 204-210 using the electronic design automation device 102, the floor planning logic 114, and components in the tool/layout database 108. A particular clock gating cell 302-308 may be positioned on a particular path 204-210 at a location based on a signal propagation time to propagate an enable signal from a particular clock gating cell 302-308 to a particular digital data storage element 212-218. For example, in a particular embodiment, the first clock gating cell 302 may be positioned on the first path 204 at a location based on a signal propagation time (e.g., the first timing margin 310) to propagate an enable signal to the digital data storage elements 212 from the first clock gating cell 302. The enable signal may be generated by the first clock gating cell 302 in response to a clock signal from the clock source 202. In a particular embodiment, the enable signal may be configured to turn off the digital data storage elements 212. As explained below with respect to FIG. 5, the enable signal may also be able to turn off buffers 502 on the first path 204. The location of the first clock gating cell 302 may increase the signal propagation time while enabling the enable signal to turn off the digital data storage elements 212 during a clock cycle of the clock signal.

Referring to FIG. 3, a second particular illustrative embodiment of a circuit 300 is shown where clock gating cells have been inserted by the placement logic 116 into the circuit 200 of FIG. 2. For example, a first clock gating cell 302 has been inserted in the first path 204, a second clock gating cell 304 has been inserted in the second path 206, a third clock gating cell 306 has been inserted in the third path 208, and a fourth clock gating cell 308 has been inserted in the fourth path 210. The first path 204 contains a first timing margin 310, the second path 206 contains a second timing margin 312, the third path 208 contains a third timing margin 314, and the fourth path 210 contains a fourth timing margin 316. Each timing margin 310-316 is graphically depicted as a distance corresponding to the available time present in a clock cycle and comprises the difference between the actual change in an enable signal and the latest time at which the enable signal can change in order for the enable signal to be effective. Timing margins 310-316 are different lengths because the signal propagation along each path is different and therefore the timing margin for each path is different. In a particular embodiment, the timing margins 310-316 indicate the maximum distance the clock gating cells can be moved towards the clock source. In another particular embodiment, the timing margin is automatically determined by the electronic design automation device 102.

Figure 4:
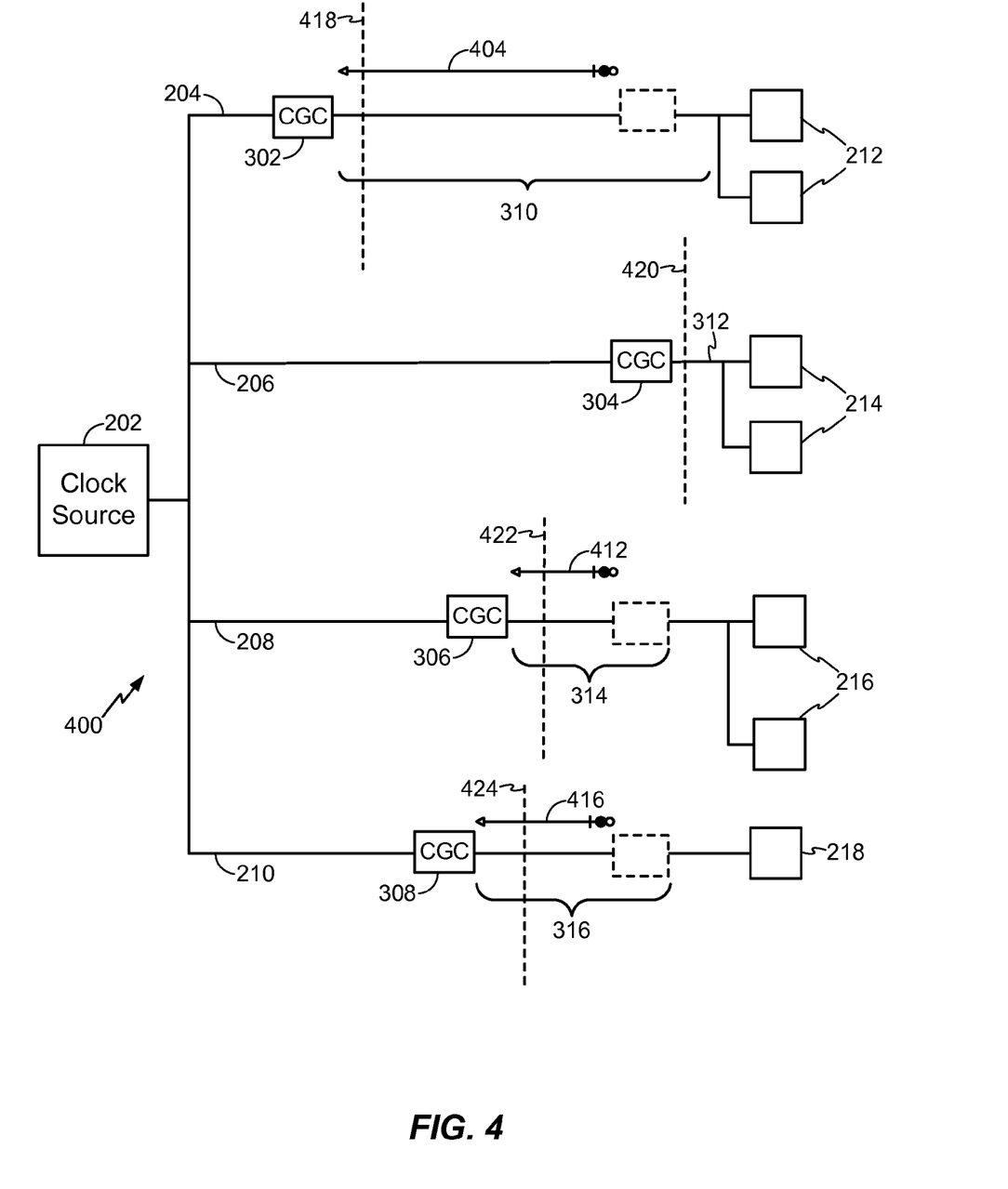
FIG. 4 is a diagram of a third illustrative embodiment of a circuit generated by the system of FIG. 1.

Referring to FIG. 4, a third particular illustrated embodiment of a circuit 400 is shown where the clock gating cells of the circuit 300 have been moved a distance away from the digital data storage elements when the timing margin of each path exceeds a predetermined threshold and where the distance moved is based on the timing margins of each path. For example, on the first path 204, the timing margin 310 exceeds the first predetermined threshold 418 and the clock gating cell has moved a distance 404 away from the digital data storage elements 212 toward the clock source 202. On the second path 206, the timing margin 312 does not exceed the second predetermined threshold 420 and the clock gating cell 304 has not been moved from the digital data storage elements 214 towards the clock source 202. On the third path 316, the timing margin 314 exceeds the third predetermined threshold 422 and the clock gating cell 306 has been moved a distance 412 away from the digital data storage elements 216 towards the clock source 202. On the fourth path 210, the timing margin 316 exceeds the fourth predetermined threshold 424 and the clock gating cell 308 has been moved a distance 416 from the digital data storage elements 218 towards the clock source 202. In a particular embodiment, the predetermined thresholds 418-424 are set by the electronic design automation device 102 and are based on the timing margin for each path. In another embodiment, the predetermined thresholds 418-424 are set by a user. For example, the predetermined threshold 418 may be the same for each path and set by the user at about 1 nanosecond. In another particular embodiment, the distance 404, 412, or 416 that a clock gating cell is moved from the digital data storage element is a furthest or maximum distance the clock gating cell can be moved from the digital data storage element based on the timing margin.

Figure 5:
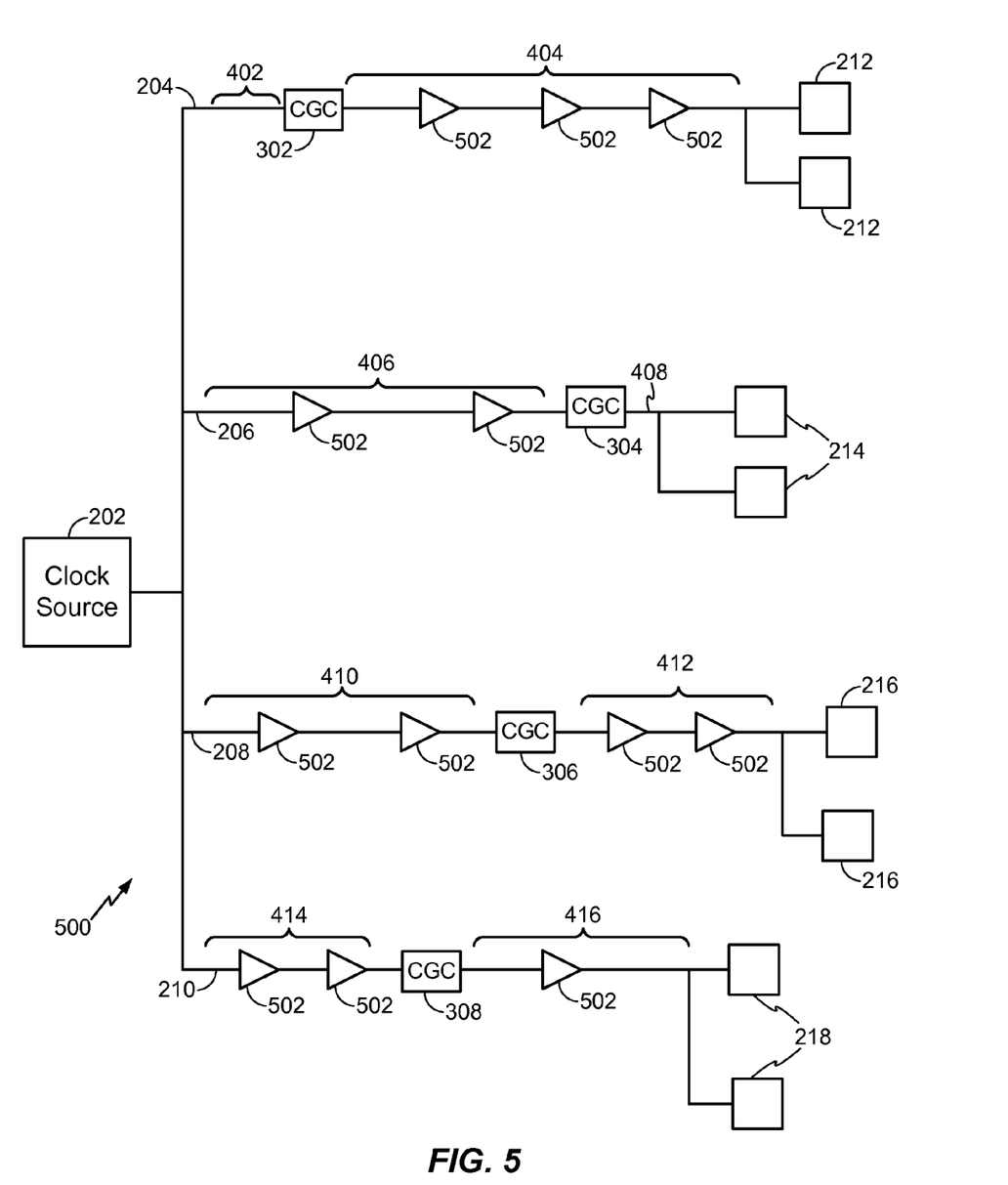
FIG. 5 is a diagram of a fourth illustrative embodiment of a circuit generated by the system of FIG. 1.

Referring to FIG. 5, a fourth particular illustrated embodiment of a circuit 500 is shown that corresponds to the circuit 400 after buffers 502 have been inserted along each path of the circuit 400 by the clock tree synthesis logic 120. For example, on the first path 204, three buffers 502 have been inserted in the path 204 in the area 404 from the clock gating cell 302 to the digital data storage elements 212 and zero buffers have been inserted in the path 204 in the area 402 from the clock gating cell 302 to the clock source 202. On the second path 206, zero buffers 502 have been inserted in the path 206 in the area 408 from the clock gating cell 304 to the digital data storage elements 214 and two buffers 502 have been inserted in the path 206 in the area 406 from the clock gating cell 304 to the clock source 202. On the third path 208, two buffers 502 have been inserted in the path 208 in the area 412 from the clock gating cell 306 to the digital data storage elements 216 and two buffers have been inserted in the path 208 in the area 410 from the clock gating cell 304 to the clock source 202. On the fourth path 210, one buffer 502 has been inserted in the path 210 in the area 416 from the clock gating cell 308 to the digital data storage elements 218 and two buffers 502 have been inserted in the path 210 in the area 414 from the clock gating cell 308 to the clock source 202. The buffers 502 are inserted to reduce clock phase delay and deviations of the clock signal and help reduce the delay uncertainty and avoid a potential system malfunction of the circuit 500.

Figure 6:
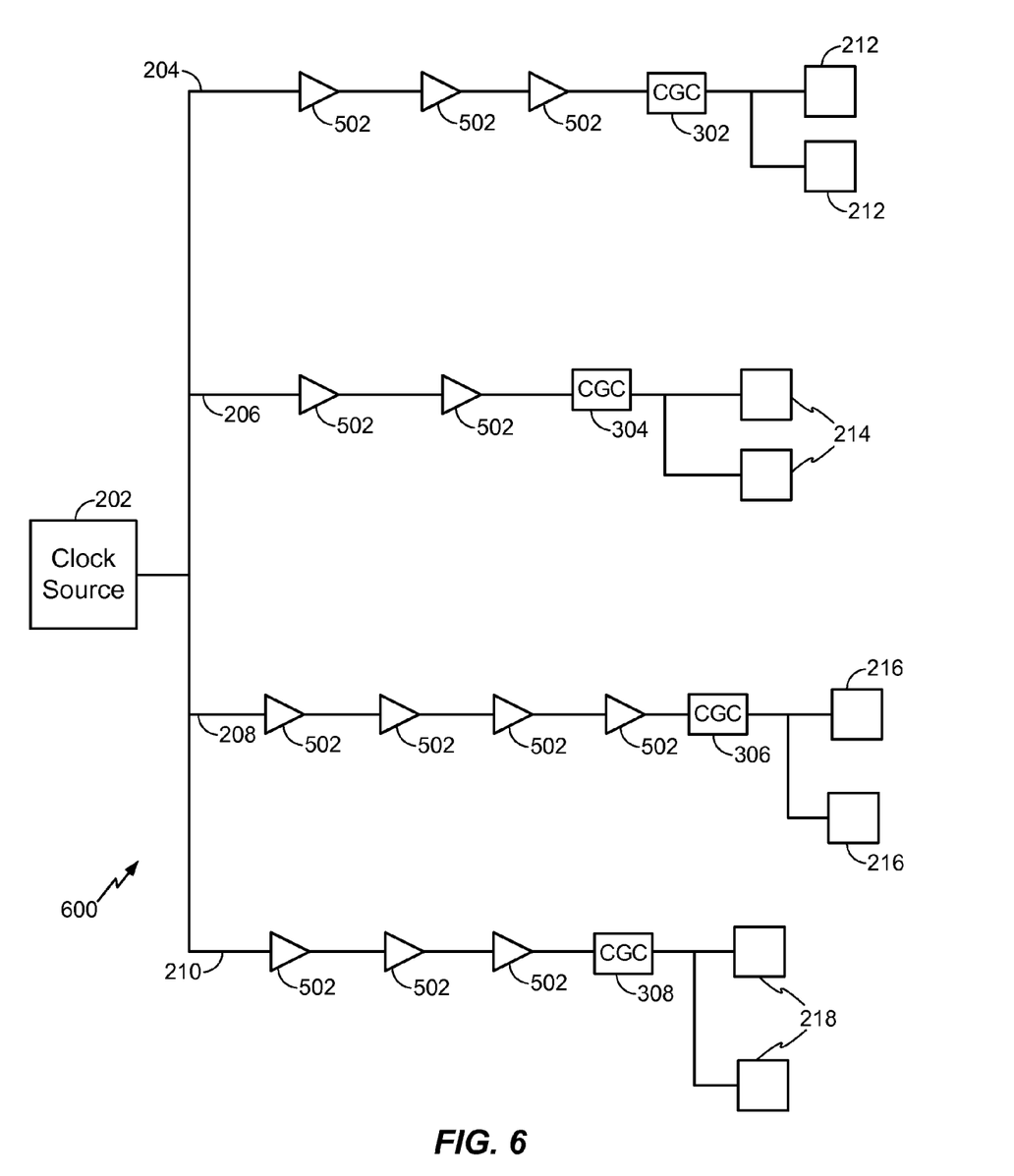
FIG. 6 is a diagram of a fifth embodiment of a circuit generated by the system of FIG. 1.

Referring to FIG. 6, a particular illustrated embodiment is shown of a circuit 600 where the clock gating cells have not been moved a distance from the logic gates based on the timing margin. In a particular embodiment, the circuit 600 may be generated in the same manner as the circuit 500, but the timing margin logic 118 of FIG. 1 does not operate on the circuit 300 of FIG. 3 as described with respect to FIG. 4 where the clock gating cells of the circuit 300 have been moved a distance away from the digital data storage elements when the timing margin of each path exceeds a predetermined threshold. In a particular embodiment, the simulation logic 122 is used to determine the power consumption of the circuit 600. In addition, the simulation logic 122 is used to determine the power consumption of the circuit 500 and the user can compare the power consumption of each circuit and select either the circuit 500 or the circuit 600 as the final design.

Comparing FIG. 5 to FIG. 6, FIG. 5 shows three buffers 502 inserted between the clock gating cell 302 and the digital data storage elements 212 on the first path 204, and in contrast, FIG. 6 shows zero buffers inserted between the clock gating cell 302 and the digital data storage elements 212 on the first path 204. Consequently, when the clock gating cell 302 shown in FIG. 5 turns off areas of the clock tree not in use, the three buffers 502 on the first path 204 are also turned off, thus conserving power. In contrast, when the clock gating cell 302 shown in FIG. 6 turns off areas of the clock tree not in use, zero buffers 502 are turned off, thus potentially wasting power because power is being supplied to unused buffers.

Figure 7:
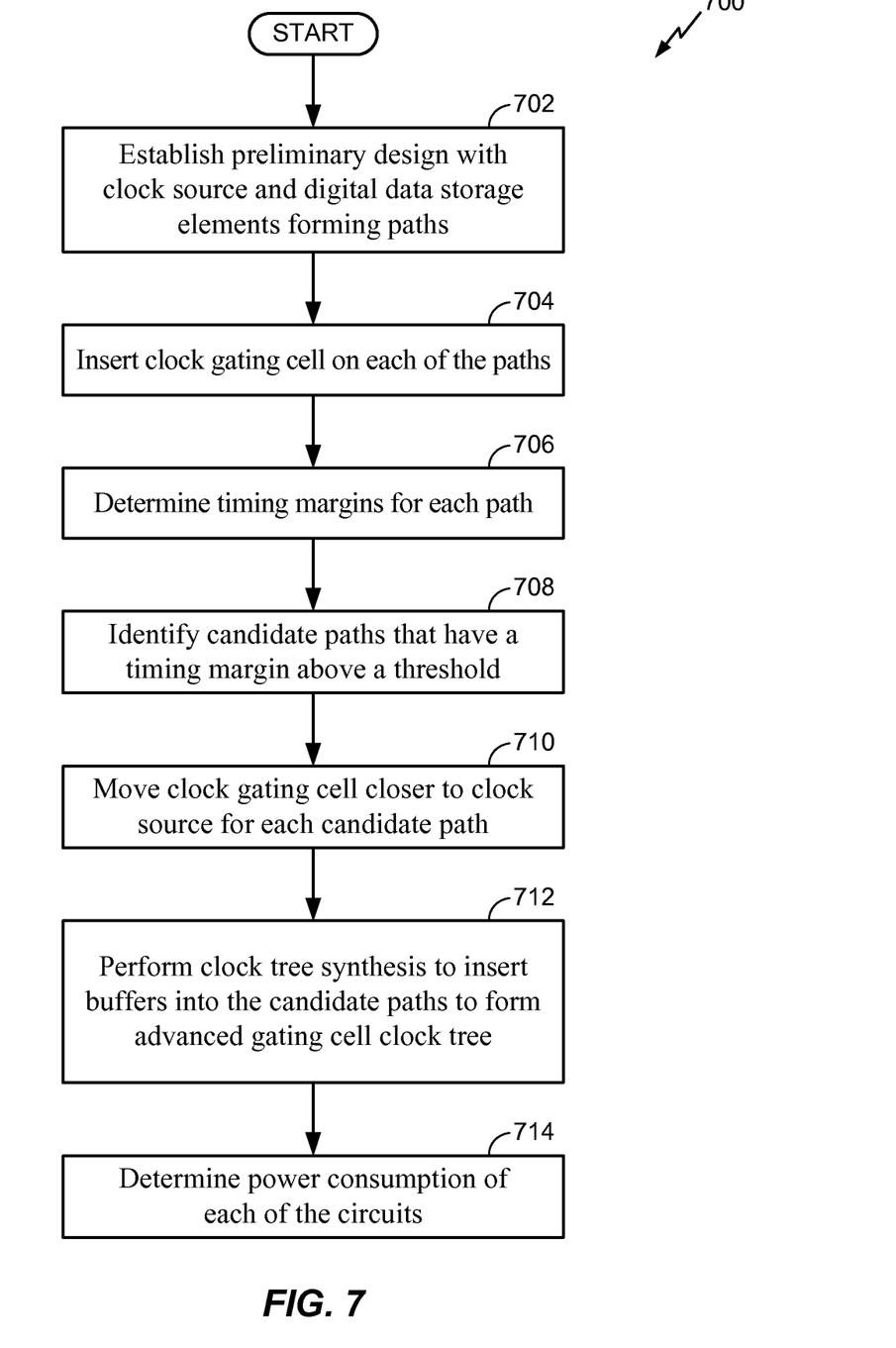
FIG. 7 is a flow chart of a particular illustrative embodiment of a method of generating a clock tree.

Referring to FIG. 7, a particular illustrative embodiment of a method of generating a clock tree is depicted and generally designated 700. In an illustrative embodiment, the method 700 may be performed by the system 100 of FIG. 1.

In a particular embodiment, at 702, a preliminary design that includes a clock source and logic gates on paths is established. For example, using the floor planning logic 114 and the components in the tool/layout database 108, the circuit 200 shown in FIG. 2 is created. Continuing to 704, a clock gating cell may be inserted into each of the paths. For example, the placement logic 116 inserts the clock gating cells in to the paths of the circuit 300 shown in FIG. 3.

Moving to 706, the timing margins for each path of the circuit is determined. For example, the timing margin 310 from the clock gating cell 302 to the digital data storage elements 212 along the first path 204 may be determined by the system 100. In a particular embodiment, the timing margin is automatically determined. For example, the timing margin may be automatically determined by the electronic design automation device 102. Advancing to 708, a candidate path that has a timing margin above a threshold is identified. In one embodiment, a predetermined threshold is set by the electronic design automation device 102 and is based on the timing margin for each path. In another embodiment, the predetermined threshold is set by the user. Continuing to 710, the clock gating cell is moved closer to the clock source for each candidate path where the timing margin is above the predetermined threshold. For example, on the first path 204, the timing margin 310 exceeds the predetermined threshold 418 and the clock gating cell 302 has been moved a distance 404 away from the digital data storage elements 212 towards the clock source 202.

Moving to 712, a clock tree synthesis is preformed to insert buffers into the candidate paths to help reduce the delay uncertainty. For example, on the first path 204, three buffers 502 have been inserted in the path 204 in the area 404 from the clock gating cell 302 to the digital data storage elements 212 and zero buffers have been inserted in the path 204 in the area 402 from the clock gating cell 302 to the clock source 202. Advancing to 714, in a particular embodiment, the power consumption of the circuit is determined. For example, the simulation logic 122 is used to determine the power consumption of the circuit 500.

Figure 8:
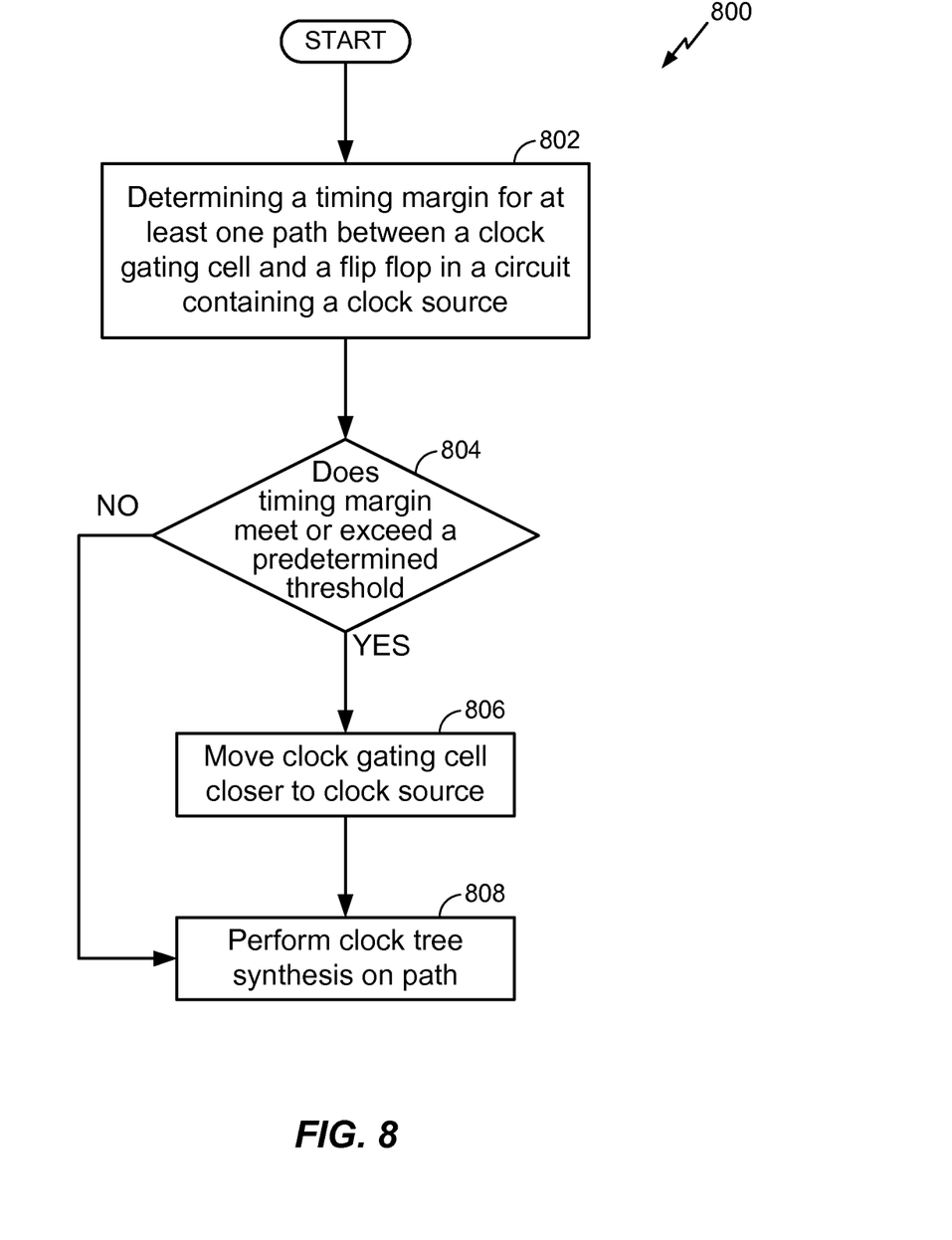
FIG. 8 is a flow chart of a second illustrative embodiment of a method of generating a clock tree.

Referring to FIG. 8, a particular illustrative embodiment of a method of generating a clock tree is depicted and generally designated 800. In an illustrative embodiment, the method 800 may be performed by the system 100 of FIG. 1.

At 802, a timing margin for at least one path between a clock gating cell and a digital data storage element in a circuit containing a clock source is determined. For example, the timing margin 310 from the clock gating cell 302 to the digital data storage elements 212 along the first path 204 is determined by the system 100. Continuing to 804, a determination is made whether the timing margin meets a predetermined threshold. In one embodiment, the predetermined threshold is automatically set by the electronic design automation device 102 and is based on the timing margin for each path. In another embodiment, the predetermined threshold is set by the user. Moving to 806, if the timing margin meets or exceeds the predetermined threshold, the clock gating cell is moved closer to the clock source. For example, on the first path 204, the timing margin 310 meets or exceeds the predetermined threshold 418 and the clock gating cell 302 has moved a distance 404 away from the digital data storage elements 212 toward the clock source 202. Advancing to 808, a clock tree synthesis on the path is performed and buffers are inserted into the path. For example, on the first path 204, the clock tree synthesis is performed and three buffers 502 have been inserted in the path 204 in the area 404 from the clock gating cell 302 to the digital data storage elements 212 and zero buffers have been inserted in the path 204 in the area 402 from the clock gating cell 302 to the clock source 202. By moving the clock gating cell away from the digital data storage elements when the timing margin meets a predetermined threshold, more elements or components of the clock tree are turned off when such elements or components are not in use, resulting in power conservation.

Figure 9:
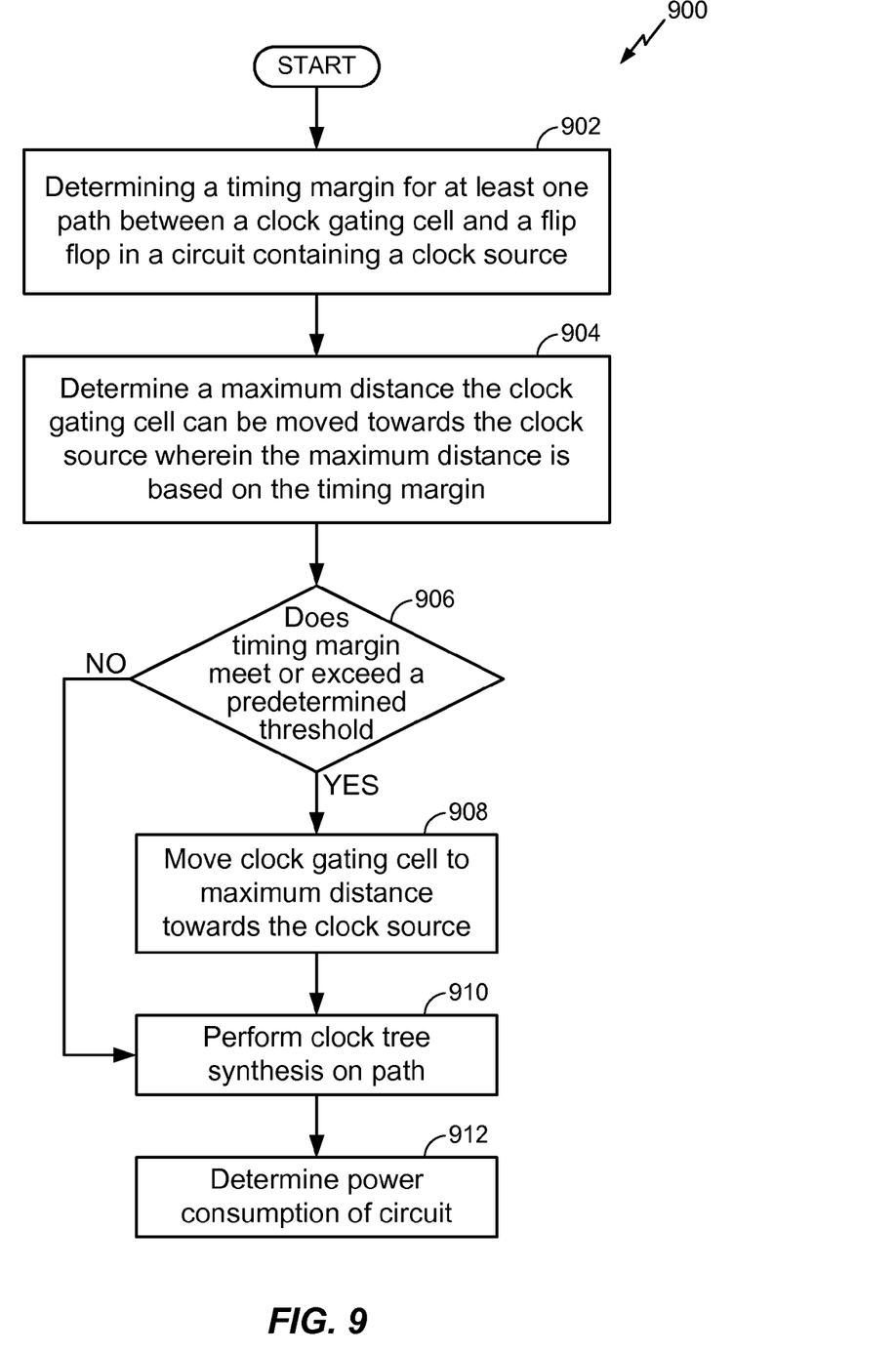
FIG. 9 is a flow chart of a third illustrative embodiment of a method of generating a clock tree.

Referring to FIG. 9, a particular illustrative embodiment of a method of generating a clock tree is depicted and generally designated 900. In an illustrative embodiment, the method 900 may be performed by the system 100 of FIG. 1.

A timing margin for at least one path between a clock gating cell and a digital data storage element in a circuit containing a clock source is determined, at 902. For example, the timing margin 310 from the clock gating cell 302 to the digital data storage elements 212 along the first path 204 is determined by the system 100. Continuing to 904, a maximum distance the clock gating cell can be moved towards the clock source is determined where the maximum distance is based on the timing margin. Moving to 906, a determination is made whether or not the timing margin exceeds a predetermined threshold. Advancing to 908, if the timing margin exceeds the predetermined threshold, the clock gating cell is moved a maximum distance towards the clock source. For example, on the first path 204, the timing margin 310 exceeds the predetermined threshold 418 and the clock gating cell has moved a maximum distance 404 away from the digital data storage elements 212 towards the clock source 202. If the timing margin does not exceed the predetermined threshold, the clock gating cell is not moved towards the clock source. For example, on the second path 206, the timing margin 312 does not exceed the predetermined threshold 420 and the clock gating cell is not moved away from the digital data storage elements 214 towards the clock source 202. Continuing to 910 a clock tree synthesis is performed and buffers are inserted into path. For example, on the first path 204, three buffers 502 have been inserted in the path 204 in the area 404 from the clock gating cell 302 to the digital data storage elements 212 and zero buffers have been inserted in the path 204 in the area 402 from the clock gating cell 302 to the clock source 202. Advancing to 912, a power consumption of the circuit design is determined. For example, the simulation logic 122 is used to determine a power consumption of the circuit design 500, a portion of the circuit design, or the clock tree. By moving the clock gating cell away from the logic gates when the timing margin meets a predetermined threshold, more elements or components of the clock tree are turned off when such elements or components are not in use resulting in power conservation.

Figure 10:
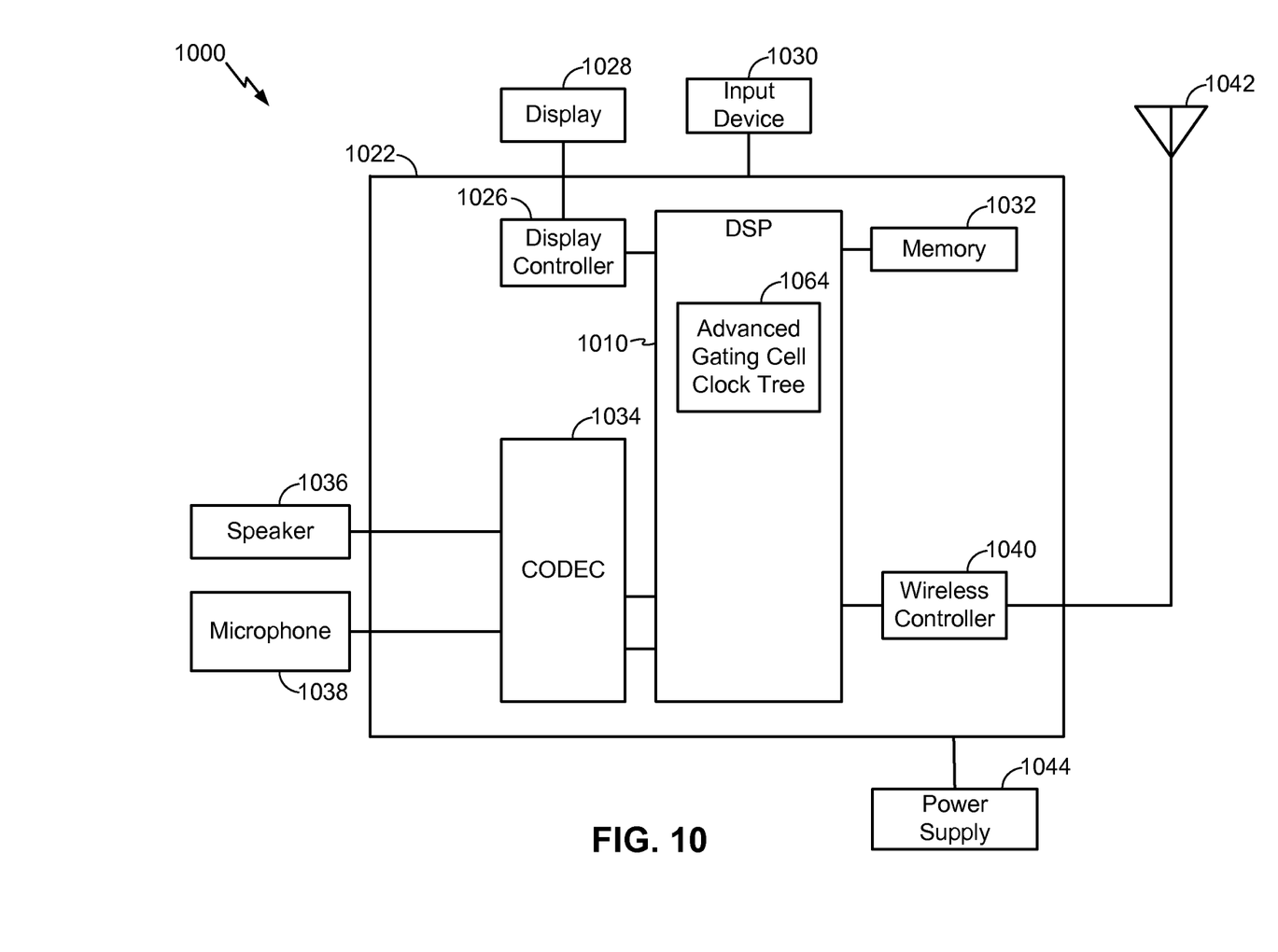
FIG. 10 is a block diagram of an illustrative communication device that includes a circuit generated by the system of FIG. 1.

FIG. 10 is a block diagram of an illustrative embodiment of a wireless communication device. The wireless communications device 1000 includes a digital signal processor (DSP) 1010 that contains an advanced gating cell clock tree 1064 generated by the system 100 of FIG. 1 in accordance with the method 700 of FIG. 7, the method 800 of FIG. 8, or the method 900 of FIG. 9, or any combination thereof. In a particular embodiment, the advanced gating cell clock tree 1064 may be used with any or all of the components of the wireless communication device 1000. Wireless communication device 1000 may be a cellular phone, a terminal, a handset, a personal digital assistant ("PDA"), a wireless modem, or other wireless device. The wireless communication system may be a Code Division Multiple Access (CDMA) system, a Global System for Mobile Communications (GSM) system, or similar communication system.

FIG. 10 also indicates that a display controller 1026 is coupled to the DSP 1010 and to a display 1028. Additionally, a memory 1032 is coupled to the DSP 1010. A coder/decoder (CODEC) 1034 is also coupled to the DSP 1010. A speaker 1036 and a microphone 1038 are coupled to the CODEC 1034. Also, a wireless controller 1040 is coupled to the DSP 1010 and to a wireless antenna 1042. In a particular embodiment, a power supply 1044 and an input device 1030 are coupled to an on-chip system 1022. In a particular embodiment, as illustrated in FIG. 10, the display 1028, the input device 1030, the speaker 1036, the microphone 1038, the wireless antenna 1042, and the power supply 1044 are external to the on-chip system 1022. However, each is coupled to a component of the on-chip system 1022.

Figure 11:
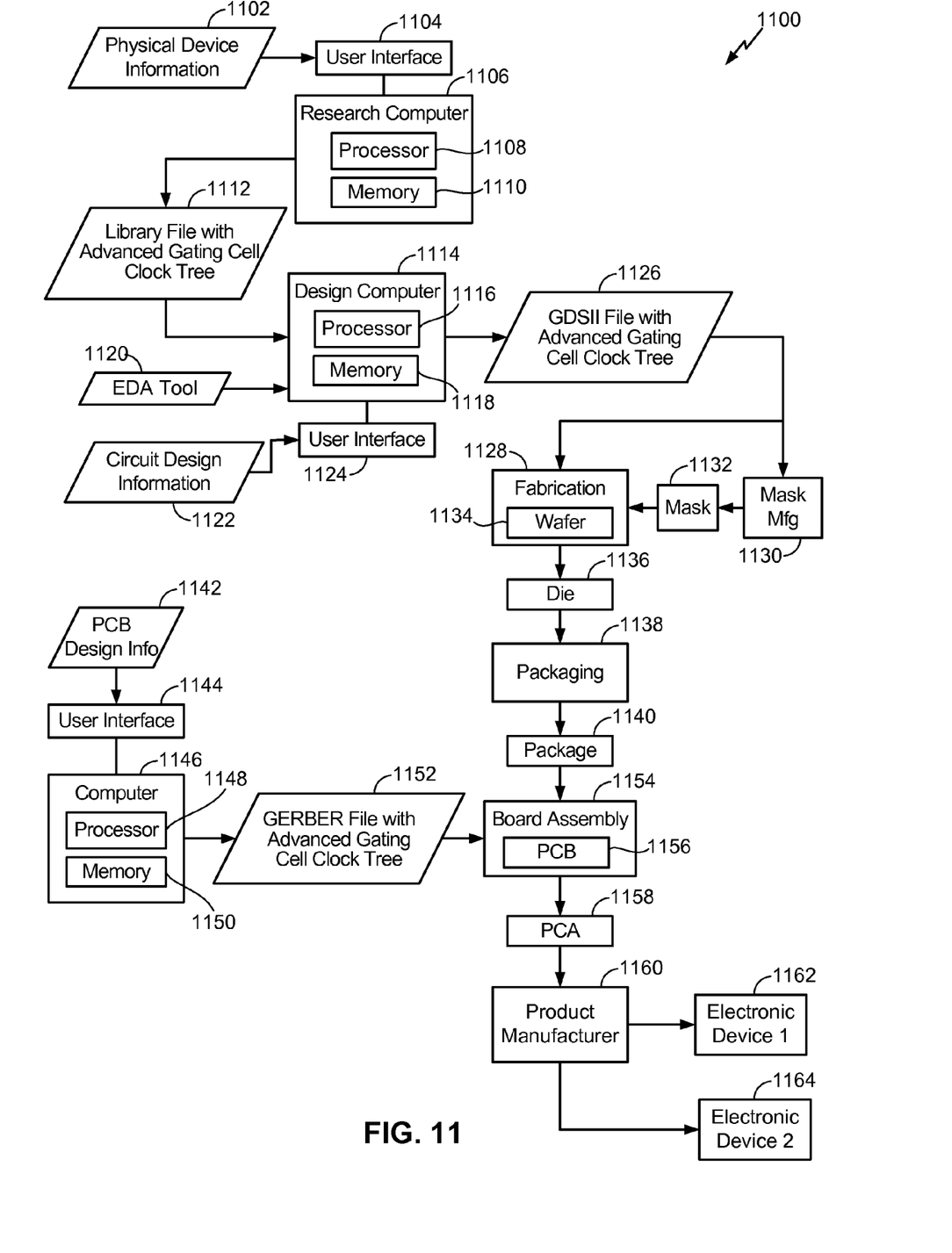
FIG. 11 is a block diagram of an illustrative embodiment of a manufacturing process that includes a circuit generated by the system of FIG. 1.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above. FIG. 11 depicts a particular illustrative embodiment of an electronic device manufacturing process 1100.

Physical device information 1102 is received in the manufacturing process 1100, such as at a research computer 1106. The physical device information 1102 may include design information representing at least one physical property of a clock tree used in a semiconductor device, such as the clock tree of FIG. 5. For example the physical device information 1102 may include physical parameters, material characteristics, and structure information that is entered via a user interface 1104 coupled to the research computer 1106. The research computer 1106 includes a processor 1108, such as one or more processing cores, coupled to a computer readable medium such as a memory 1110. The memory 1110 may store computer readable instructions that are executable to cause the processor 1108 to transform the physical device information 1102 to comply with a file format and to generate a library file 1112.

In a particular embodiment, the library file 1112 includes at least one data file including the transformed design information. For example, the library file 1112 may include a library of semiconductor devices including the clock tree of FIG. 5 that is provided for use with an electronic design automation (EDA) tool 1120.

The library file 1112 may be used in conjunction with the EDA tool 1120 at a design computer 1114 including a processor 1116, such as one or more processing cores, coupled to a memory 1118. The EDA tool 1120 may be stored as processor executable instructions at the memory 1118 to enable a user of the design computer 1114 to design a circuit using the clock tree of FIG. 5 of the library file 1112. For example, a user of the design computer 1114 may enter circuit design information 1122 via a user interface 1124 coupled to the design computer 1114. The circuit design information 1122 may include design information representing at least one physical property of a semiconductor device, such as the clock tree of FIG. 5. To illustrate, the circuit design property may include identification of particular circuits and relationships to other elements in a circuit design, positioning information, feature size information, interconnection information, or other information representing a physical property of a semiconductor device.

The design computer 1114 may be configured to transform the design information, including the circuit design information 1122 to comply with a file format.

To illustrate, the file formation may include a database binary file format representing planar geometric shapes, text labels, and other information about a circuit layout in a hierarchical format, such as a Graphic Data System (GDSII) file format. The design computer 1114 may be configured to generate a data file including the transformed design information, such as a GDSII file 1126 that includes information describing the clock tree of FIG. 5 in addition to other circuits or information. To illustrate, the data file may include information corresponding to a system-on-chip (SOC) that includes the clock tree of FIG. 5 and that also includes additional electronic circuits and components within the SOC.

The GDSII file 1126 may be received at a fabrication process 1128 to manufacture the clock tree of FIG. 5 according to transformed information in the GDSII file 1126. For example, a device manufacture process may include providing the GDSII file 1126 to a mask manufacturer 1130 to create one or more masks, such as masks to be used for photolithography processing, illustrated as a representative mask 1132. The mask 1132 may be used during the fabrication process to generate one or more wafers 1134, which may be tested and separated into dies, such as a representative die 1136.

The die 1136 includes a circuit including the clock tree of FIG. 5.

The die 1136 may be provided to a packaging process 1138 where the die 1136 is incorporated into a representative package 1140. For example, the package 1140 may include the single die 1136 or multiple dies, such as a system-in-package (SiP) arrangement. The package 1140 may be configured to conform to one or more standards or specifications, such as Joint Electron Device Engineering Council (JEDEC) standards.

Information regarding the package 1140 may be distributed to various product designers, such as via a component library stored at a computer 1146. The computer 1146 may include a processor 1148, such as one or more processing cores, coupled to a memory 1110. A printed circuit board (PCB) tool may be stored as processor executable instructions at the memory 1110 to process PCB design information 1142 received from a user of the computer 1146 via a user interface 1144. The PCB design information 1142 may include physical positioning information of a packaged semiconductor device on a circuit board, the packaged semiconductor device corresponding to the package 1140 including the clock tree of FIG. 5.

The computer 1146 may be configured to transform the PCB design information 1142 to generate a data file, such as a GERBER file 1152 with data that includes physical positioning information of a packaged semiconductor device on a circuit board, as well as layout of electrical connections such as traces and vias, where the packaged semiconductor device corresponds to the package 1140 including the clock tree of FIG. 5. In other embodiments, the data file generated by the transformed PCB design information may have a format other than a GERBER format.

The GERBER file 1152 may be received at a board assembly process 1154 and used to create PCBs, such as a representative PCB 1156, manufactured in accordance with the design information stored within the GERBER file 1152. For example, the GERBER file 1152 may be uploaded to one or more machines for performing various steps of a PCB production process. The PCB 1156 may be populated with electronic components including the package 1140 to form a represented printed circuit assembly (PCA) 1158.

The PCA 1158 may be received at a product manufacture process 1160 and integrated into one or more electronic devices, such as a first representative electronic device 1162 and a second representative electronic device 1164. As an illustrative, non-limiting example, the first representative electronic device 1162, the second representative electronic device 1164, or both, may be selected from the group of a set top box, a music player, a video player, an entertainment unit, a navigation device, a communications device, a personal digital assistant (PDA), a fixed location data unit, and a computer. As another illustrative, non-limiting example, one or more of the electronic devices 1162 and 1164 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although FIG. 5 may illustrate a remote unit according to the teachings of the disclosure, the disclosure is not limited to the exemplary illustrated unit. Embodiments of the disclosure may be suitably employed in any device which includes active integrated circuitry including memory and on-chip circuitry for test and characterization.

Thus, the clock tree of FIG. 5 may be fabricated, processed, and incorporated into an electronic device, as described in the illustrative process 1100. One or more aspects of the embodiments disclosed with respect to FIGS. 1-9 may be included at various processing stages, such as within the library file 1112, the GDSII file 1126, and the GERBER file 1152, as well as stored at the memory 1110 of the research computer 1106, the memory 1118 of the design computer 1114, the memory 1150 of the computer 1146, the memory of one or more other computers or processors (not shown) used at the various stages, such as at the board assembly process 1154, and also incorporated into one or more other physical embodiments such as the mask 1132, the die 1136, the package 1140, the PCA 1158, other products such as prototype circuits or devices (not shown), or any combination thereof. Although various representative stages of production from a physical device design to a final product are depicted, in other embodiments fewer stages may be used or additional stages may be included. Similarly, the process 1100 may be performed by a single entity, or by one or more entities performing various stages of the process 1100.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), a magnetoresistive random access memory (MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus, comprising:
a semiconductor device comprising:
a clock signal generator;
a plurality of digital data storage elements coupled to the clock signal generator by respective paths; and
a respective clock gating cell positioned on each of the paths, wherein a particular clock gating cell is positioned on a particular path at a location based on a signal propagation time to propagate an enable signal to a particular digital data storage element associated with the particular path from the particular clock gating cell.

2. The apparatus of claim 1, wherein the enable signal is generated by the particular clock gating cell in response to a clock signal from the clock generator, wherein the enable signal is configured to turn off the particular digital data storage element, and wherein the location that the particular clock gating cell is positioned increases the signal propagation time while enabling the enable signal to turn off the particular digital data storage element during a clock cycle of the clock signal.

3. The apparatus of claim 1, further comprising a device selected from the group consisting of a set top box, a music player, a video player, an entertainment unit, a navigation device, a communications device, a personal digital assistant (PDA), a fixed location data unit, and a computer, into which the semiconductor device is integrated.

4. The apparatus of claim 1, wherein the semiconductor device is housed within a mobile terminal.

5. The apparatus of claim 1, wherein the signal propagation time between the particular clock gating cell and the respective digital storage element is about 1 nanosecond.

6. An apparatus, comprising:
means for generating a clock signal;
means for coupling a plurality of digital data storage elements to the clock signal by respective paths; and
means for positioning a particular clock gating cell on a particular path at a location based on a signal propagation time to propagate an enable signal to a particular digital data storage element associated with the particular path from the particular clock gating cell.

7. The apparatus of claim 6, wherein the means for generating is integrated on a semiconductor die.

8. The apparatus of claim 6, wherein the enable signal is generated by the particular clock gating cell in response to the clock signal, wherein the enable signal is configured to turn off the particular digital data storage element, and wherein the location that the particular clock gating cell is positioned increases the signal propagation time while enabling the enable signal to turn off the particular digital data storage element during a clock cycle of the clock signal.

9. A method, comprising:
determining, with a processor, a timing margin for a path between a clock gating cell and a digital data storage element in a circuit comprising a clock source coupled to the digital storage element via the clock gating cell, wherein the timing margin includes a signal propagation time to propagate an enable signal from the clock gating cell to the digital data storage element; and positioning the clock gating cell at a location on the path based on the signal propagation time.

10. The method of claim 9, wherein the processor is integrated into an electronic device.

11. The method of claim 9, further comprising determining a power consumption of the circuit.

12. The method of claim 9, wherein the enable signal is generated by the clock gating cell in response to a clock signal from the clock source, wherein the enable signal is configured to turn off the digital data storage element, and wherein the location that the clock gating cell is positioned increases the signal propagation time while enabling the enable signal to turn off the digital data storage element during a clock cycle of the clock signal.

13. The method of claim 9, wherein the digital data storage element is a flip flop.

14. The method of claim 9, further comprising inserting three buffers into the path.

15. The method of claim 14, wherein the inserting the three buffers into the path comprises inserting the three buffers between the clock gating cell and the digital data storage element.

16. The method of claim 14, wherein positioning the clock gating cell on the path permits the enable signal to turn off the three buffers.

17. The method of claim 16, wherein positioning the clock gating cell includes moving the clock gating cell from a first location to a second location, wherein the second location is closer to the clock source than the first location.

18. A method, comprising:
a first step for determining a timing margin for a path between a clock gating cell and a digital data storage element in a circuit comprising a clock source coupled to the digital storage element via the clock gating cell, wherein the timing margin includes a signal propagation time to propagate an enable signal from the clock gating cell to the digital data storage element; and
a second step for positioning the clock gating cell at a location on the path based on the signal propagation time.

19. The method of claim 18, wherein the first step and the second step are performed by a processor integrated into an electronic device.

20. A non-transitory computer readable medium comprising instructions that, when executed by a processor, cause the processor to:
determine a timing margin for a path between a clock gating cell and a digital data storage element in a circuit comprising a clock source coupled to the digital storage element via the clock gating cell, wherein the timing margin includes a signal propagation time to propagate an enable signal from the clock gating cell to the digital data storage element; and
position the clock gating cell at a location on the path based on the signal propagation time.

21. The non-transitory computer readable medium of claim 20, wherein the circuit is integrated in a device selected from the group consisting of a set top box, a music player, a video player, an entertainment unit, a navigation device, a communications device, a personal digital assistant (PDA), a fixed location data unit, and a computer.

22. A method, comprising:
receiving design information representing at least one physical property of a semiconductor device, wherein the semiconductor device comprises:
a clock signal generator;
a plurality of digital data storage elements coupled to the clock signal generator by respective paths; and
a respective clock gating cell positioned on each of the paths, wherein a particular clock gating cell is positioned on a particular path at a location based on a signal propagation time to propagate an enable signal to a particular digital data storage element associated with the particular path from the particular clock gating cell;
transforming the design information to comply with a file format; and
generating a data file including the transformed design information.

23. The method of claim 22, wherein the data file has a GDSII format.

24. A method, comprising:
receiving a data file including design information corresponding to a semiconductor device; and
fabricating the semiconductor device according to the design information, wherein the semiconductor device comprises:
a clock signal generator;
a plurality of digital data storage elements coupled to the dock signal generator by respective paths; and
a respective clock gating cell positioned on each of the paths, wherein a particular clock gating cell is positioned on a particular path at a location based on a signal propagation time to propagate an enable signal to a particular digital data storage element associated with the particular path from the particular clock gating cell.

25. The method of claim 24, wherein the data file has a GDSII format.

26. A method, comprising:
receiving design information including physical positioning information of a packaged semiconductor device on a circuit board, the packaged semiconductor device including a semiconductor structure comprising:
a clock signal generator;
a plurality of digital data storage elements coupled to the clock signal generator by respective paths;
a respective clock gating cell positioned on each of the paths, wherein a particular clock gating cell is positioned on a particular path at a location based on a signal propagation time to propagate an enable signal to a particular digital data storage element associated with the particular path from the particular clock gating cell.

27. The method of claim 26, wherein the data file has a GERBER format.

28. A method, comprising:
receiving a data file including design information including physical positioning information of a packaged semiconductor device on a circuit board; and
manufacturing the circuit board configured to receive the packaged semiconductor device according to the design information, wherein the packaged semiconductor device comprises a semiconductor device comprising:
a clock signal generator;
a plurality of digital data storage elements coupled to the clock signal generator by respective paths;

a respective clock gating cell positioned on each of the paths, wherein a particular clock gating cell is positioned on a particular path at a location based on a signal propagation time to propagate an enable signal to a particular digital data storage element associated with the particular path from the particular clock gating cell.

29. The method of claim 28, wherein the data file has a GERBER format.

30. The method of claim 28, further comprising integrating the circuit board into an apparatus selected from the group consisting of a set top box, a music player, a video player, an entertainment unit, a navigation device, a communications device, a personal digital assistant (RDA), a fixed location data unit, and a computer.

* * * * *